Figure 1:
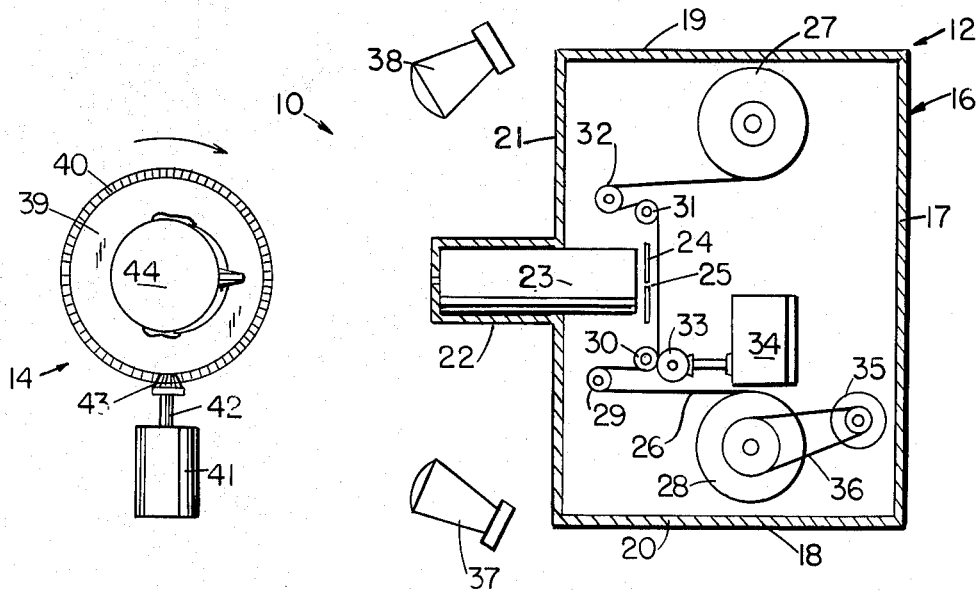

April 5, 1966     J. H. LEMELSON     3,244,065
CAMERA APPARATUS FOR PRODUCING A PLANE PICTORIAL
REPRESENTATION OF A THREE DIMENSIONAL SURFACE
Original Filed Jan. 16, 1956

INVENTOR.
Jerome H. Lemelson

United States Patent Office 3,244,065
Patented Apr. 5, 1966

3,244,065
CAMERA APPARATUS FOR PRODUCING A PLANE PICTORIAL REPRESENTATION OF A THREE DIMENSIONAL SURFACE
Jerome H. Lemelson, 8B Garfield Apts., Metuchen, N.J.
Original application Jan. 16, 1956, Ser. No. 559,232, now Patent No. 3,026,648, dated Mar. 27, 1962. Divided and this application Jan. 31, 1962, Ser. No. 170,199
17 Claims. (Cl. 88—24)

This invention relates to photographic apparatus and a method for photographing and photographically reproducing the image of the surface of a three dimensional object. This is a division of my copending application Ser. No. 559,232, filed on January 16, 1956, and entitled Advertising and Display Devices, now U.S. Patent No. 3,026,648, issued March 27, 1962.

It is known in the art to photograph a predetermined area of the surface of an object by means of conventional photography in which the aperture of a conventional camera is opened for a predetermined period of time during which light from the object is directed against a generally rectangular area of photographic film. If a larger area than can be accommodated by the camera is desired to be photographed, generally a series of different rectangular exposures or frames are photographed and are pieced together per se or oriented, spliced and then pieced together. It is obvious that the conventional technique of photographing the surface of a three dimensional member by means of deriving one or more still images of the surface of an object has many shortcomings and will not give an accurate picture of the surface particularly if the object has substantial curvature in relation to the focus of the camera. Portions of the surface, so photographed, which slope sharply away from the camera will present distorted images and may be out of focus. Inaccuracies and human errors may be introduced during the alignment and joining of a plurality of single frame photographs to form a map of the object's surface. Accordingly, it is a primary object of this invention to provide a new and improved camera apparatus and a method of photographing a three dimensional object or curved surface which will provide a single image which is an improved representation of the surface of the object in comparison to the representation obtained by means of a conventional camera.

Another object is to provide a new and improved apparatus and method for generating and recording an image of the surface of a generally convex shaped object which is generally free of many of the distortions obtained by means of conventional photography and due to variations in the distances of various portions of the object surface from the camera.

Another object is to provide an improved photographic apparatus and method for providing a single recording or image in a photographic film of the surface of the object over a substantially infinite range of attitudes relative to such surface.

Another object is to provide an apparatus for photographing the surface of a generally convex shaped object by scanning such surface as the object is rotated in synchronization with the movement of a photographic film to provide a picture which cannot possibly be obtained utilizing a conventional camera and photographic technique.

Another object is to provide an appartus for photographing generally convex surfaces in a manner to provide a single picture illustrating an image of the surface in which the surface is presented in such a manner that all the points thereof are substantially in focus and may be scaled or measured more accurately than obtainable by the conventional photographic techniques without the need for accounting for perspective dimensioning.

Another object is to provide an apparatus and method for photographing the surface of a convex or convexo-concave shaped object and for reproducing such image on the surface of a similarly shaped object without substantial distortion.

Another object is to provide an improved camera apparatus for providing an improved map of the surface of any three dimensional object having portions which substantially fall-off or slope away from other portions of said surface.

Another object is to provide an apparatus for photographically generating on a flat surface such as film, a developed image derived from peripherally scanning a three dimensional or convex surface which may be used for illustrating flat plastic sheet or the like prior to vacuum forming such sheet into a three dimensional display, thereby eliminating the need for performing the tedious and often inaccurate manual operation of providing such an illustration which is generally derived by trial and error.

Another object is to provide an improved apparatus for mapping a surface by means of a camera which is in motion.

Another object is to provide a photographic apparatus for presenting a picture of a convex surface in which dimensions may be measured without difficulty.

Another object is to provide a photographic apparatus and method for presenting a two dimensional presentation of a three dimensional object or assembly without introducing image distortion due to perspective.

Another object is to provide photographic appartus which may be utilized to provide a single photograph of a convex surfaced or multi-faceted object or assembly which reproduces portions of the surface of the object which would not ordinarily be developed in a conventional photograph.

Figure 2:
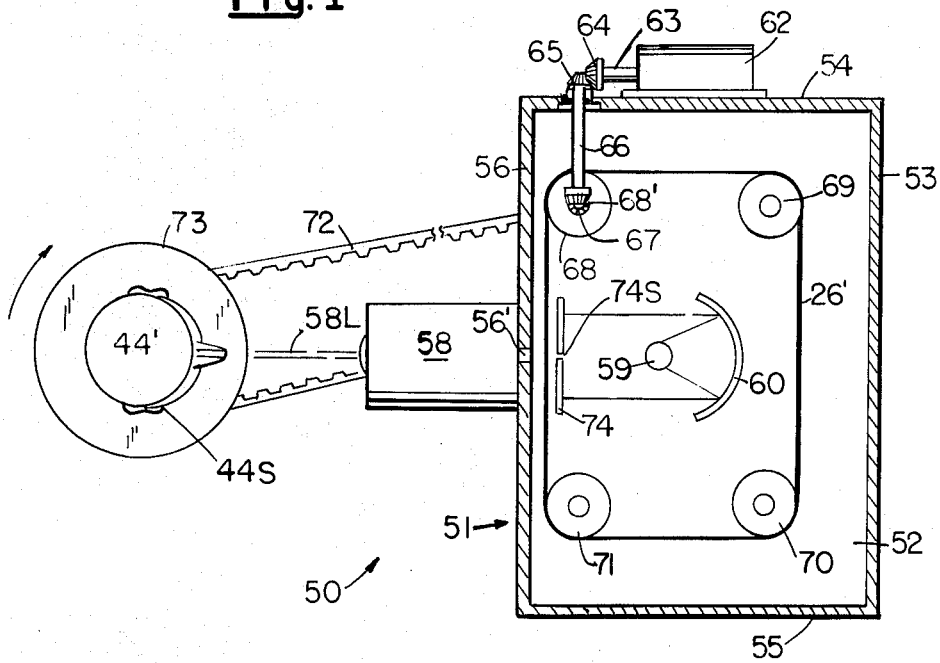

The above brief description, as well as further objects, features and advantages of the present invention will be best appreciated by reference to the following detailed description of a preferred embodiment, when taken in conjunction with the accompanying drawings, wherein:

FIG. 1 is a plan view with parts removed for clarity, showing components of a surface mapping camera apparatus and associated object mounting and moving apparatus; and FIG. 2 is a plan view of the components of a projector and photosensitized object receiving light therefrom which is derived by scanning film exposed in the camera of FIG. 1.

There is shown in FIG. 1, a camera apparatus employing the controlled movement of a subject to be photographed and what will hereinafter be referred to as a periphery camera having a film which is exposed and controlled in movement during its exposure past the optical system of the camera. The apparatus 10 comprises a camera assembly 12 and a subject assembly 14 disposed immediately in front of the optical system 23 of the camera. The subject assembly 14 comprises an object 44, the surface of which is desired to be mapped or photographed, which object is mounted on a turntable 39 which is rotated by means of a servo motor 41. The camera apparatus comprises a housing 16 having enclosing walls including a rear wall 17, side walls 18 and 19, a front wall 21, and end walls, one of which, 20, is illustrated in the cross-sectional view. A projecting portion 22 of the front wall 21 retains a housing 23 containing optical components for receiving and imaging light from the surface of the object 44 within the camera. Mounted at the rear of the optical system housing 23 is a mask 24 having a slit 25' therein permitting the passage of only a thin band of the total image derived in scanning the facing portion of the object 44 to an adjacent film strip 26 which is driven at constant speed past slit 25 by means of a drive including constant speed controlled motor 34. The film is driven from a supply reel 27 which is supported in bearing on a shaft supported by the walls of the housing to a takeup reel 28 which is also rotationally supported by bearing means secured to the side walls of the housing. The transport for the film comprises a plurality of idlers 29, 30, 31 and 32. Idler 30 cooperates with a frictional or sprocket drive wheel 33 which is driven by motor 34 and is effective in lineally moving the film 26 at a speed which is substantially equivalent to the velocity at which the surface of the object being photographed is moving such that the film will be exposed to an image light pattern which is a developed map of the convex surface being scanned derived by line scanning through the slit 25 in the mask 24. The resulting image developed in the film strip as a result of such scanning may be defined as a flat picture of the surface of the three dimensional object 44 being scanned. Notation 35 refers to a motor and drive for the takeup reel 28 which receives and stores the exposed film and which is preferably operated in accordance with conventional drive means including a belt 36 utilized to drive the conventional takeup reel of a projector or camera.

Rotation of the turntable 39 is illustrated as being effected by means of a bevel gear 40 formed of or provided on the periphery of the turntable 39 which mates with and is driven by a bevel gear 43 secured to the shaft 42 of drive motor 41. It is to be noted that the shaft 42 may be also directly coupled to the shaft of film driving motor 34 to effect synchronization of the movement of the film and rotation of the turntable 39 thereby eliminating the need for a separate drive motor such as motor 41 and means for controlling said motor so that it operates the turntable in synchronization with the film driving means of the camera. Light for illuminating the surface of the object 44 is provided by a plurality of flood lamps 37, 38, etc. The surface of the object being mapped may also be illuminated by one or more sources of coherent light generated by optical masers. A line source of laser light may also be utilized to illuminate the surface of the object along line areas thereof being scanned whereupon it may be possible to eliminate the mask 24 if the line source is synchronized to move with the camera or is projected against the moving surface band area being scanned.

The photographic apparatus illustrated in FIG. 1 may be applied in the production of various articles of manufacture and in the study or mapping of various convex or concavo-convex articles, bodies or surfaces. A conventional photograph derived by exposing a rectangular film frame to an image pattern received through a camera lens during a single opening and closing of the camera shutter, provides an image of an object, the sloping or receding surfaces of which are not to scale and are distorted. Surface measurements based on such photographs, such as distances between points, slopes and other characteristics are difficult to make with precision and frequently require the use of complex stereoscopic apparatus. Accordingly, employment of the apparatus and method of surface photography described in FIG. 1 may be utilized to simplify surface measurement and mapping.

In the production of various three dimensional or relief displays, the art of vacuum or pressure forming of a sheet of printed thermoplastic material is employed. The production of the printing plates for illustrating such display sheet material is generally based on rule-of-thumb and trial and error techniques which are tedious and time consuming. Accordingly, the following procedure is proposed for simplifying and improving such procedures for art, plate and model preparation which procedure will result in an improved and more accurate finished product.

(a) A model of the desired three dimensional article or display is first constructed of any suitable material. The model is preferably the undecorated product itself although it may be the model, from which the mold or die used to mold or shape the final product, is formed. The model is then hand illustrated or decorated or surface decorated by any suitable method.

(b) The model is next placed in the position of the object 44 on the turntable 39 of FIG. 1. The position is preferably such that the rotational axis of the turntable passes through or near the centroid or center of volume of the model or defines an axis about which the surface being scanned is substantially rotating. For irregularly shaped concavo-convex objects such as illustrated in FIG. 1 a single axis cannot be defined about which all points on the surface of the object will revolve. However, for most concave objects an axis may be determined about which the scanned surface may rotate which will yield useful results.

(c) The flat photograph derived by scanning the original surface may be employed to produce a printing plate which is used to print flat sheets of formable material such as plastic which, when vacuum or pressure formed to the contour of the original object, if the illustration derived from the plate is in registry with the mold or forming die, will have its surface decorated with image areas in the same positions thereon as the decorations or illustrations on the original model. All hand layout and trial and error procedures are thus eliminated from such procedure.

By utilizing the above procedure, display devices may be produced in which the surface illustration is derived by peripherally photographing a living animal, human being or manufactured article. For example, plastic may be thermoformed or molded to substantially the full contour or half the contour of the subject being copied, although not necessarily the same size. The above described technique of plate preparation may be employed for printing halftone images or the like which are flat developments of the image derived from the surface of a living human being, animal or article. Upon registration with a forming die or mold, if formed to part of the contour of the originally photographed subject, the surface so illustrated will be a substantially accurate and a realistic reproduction of the original model.

A projection technique as illustrated in FIG. 2 may also be employed to photographically illustrate the surface of a three dimensional article scaled or copied from that originally photographed. FIG. 2 illustrated an apparatus for exposing the photosensitized surface 44S of an object 44' which is similarly shaped to the original object 44 and mounted to receive an image pattern of light along portions of its surface corresponding to similarly shaped portions of the surface of the originally photographed object 44. A replica having the same surface decoration, illustration, or other features as the surface of the original object 44 may thus be produced. However, it is noted that the object 44' need not necessarily be the same scale or size as the object 44 since the projection apparatus 51 of FIG. 2 may be provided with an image enlarging or reducing optical projection system. The apparatus 50 consists of a projector 51 having a housing 52 consisting of a rear wall 53, side walls 54 and 55, a front wall 56 and end walls one of which 57 is illustrated in the cross-sectional view. Disposed against the front wall 56 is a housing 58 containing optical projection apparatus for receiving light from a light source 59 mounted within the housing 52 through an opening 56' in the front wall 56. A section of film 26' which has been derived by developing and fixing the film 26 exposed in the apparatus illustrated in FIG. 1 is provided as a closed loop and is driven, as illustrated, in a closed loop path around four pulleys or wheels 68 to 71. At least one of the wheels or drums 68 is driven by means of a constant speed motor and drive 62 through shafts 63 and 66 which are coupled through gears 64 and 65. A gear assembly 67 couples the shaft 66 extending into the housing with the shaft of drum 68 which is supported in bearing by the end walls of the housing 52. Operating off the shaft 68' on which the drum 68 is mounted is a driving belt 72 connected to a pulley (not shown) secured to shaft 68' and connected at its other end to a toothed pulley, also not shown, secured to a turntable 73 at its center of rotation which turntable mounts the object 44' to be exposed to the light modulated by the film 26'.

Since parallel light is desirable to scan the image developed in the film 26', a suitable reflector 60 is provided behind light source 59 and lens means 61 causes parallel light to be imaged on a mask 74 having a slit 74S therein for passing a narrow band of light through the film. The mask 74 may also be provided as part of the projection optical system mounted within housing 58. The output of housing 58 is a narrow band of parallel light which is projected against the proper portion of the surface 44S of the object 44' which surface is covered with or comprises a photosensitive material.

In the operation of the apparatus of FIG. 2, the object must be initially so positioned that a band portion of its surface will receive a band of light passed through that portion of the developed film strip 26' which received an image from a band of light scanning an area of the original object 44 similar to the area of the object 44'. By synchronizing the movement of the exposed film 26' and the rotation of table 73 such that all areas of the photosensitized surface of the copy object 44' are exposed to light received from similar areas of the original object 44, the same image as photographed of the original object may be developed in the copy object.

The object being scanned may have any suitable convex or concavo-convex shape but is preferably void of sharp and deep inflections in the surface contour thereof in or on which shadows would be cast and would be difficult to eliminate. The camera apparatus illustrated may be used to scan and provide a developed photograph of the head of a human being as well as other objects. Developed photographs of industrial models, components, machinery and the like may be provided for two dimensional analyses thereof.

If the surface contour of the object being scanned varies substantially, the camera may be mounted on a movable base which is guided in a path towards and away from the turntable and is driven by a motor which is controlled by a programming or contour following means to move towards and away from the turntable as the latter rotates so as to remain a constant distance away from the surface being scanned or rotated in accordance with changes in the attitude of the surface being scanned so as to receive an image which is viewed normal to the surface being scanned by the optical scanning system.

The turntable 39 may also be tiltable and positionally controlled in tilt by a servo other than motor 41 which servo is program controlled and/or otherwise controlled by, for example, contour sensing and control means as applied for example to the control of metal working cutting tools to predetermine the distance to be maintained from the surface and/or angle of the scanning axis or plane across the urface of the object being photographed. If programming control is employed to control the relative positions and attitudes of the camera and object being photographed, servo means may be controlled by such programming control to predetermine camera focus, lens opening at different points in a scanning cycle, etc. for both photographing and projecting the photographed image to account or compensate for surface irregularities, shadows, etc.

In lieu of rotating the object 44 being scanned, the object may be mounted fixed while the camera is orbited or swings about an axis around the object through which such axis preferably passes through the centroid of the object. The camera, in such an arrangement, may be mounted on a carriage which travels a circular or otherwise contoured track or on an arm which is guided or pivoted to swing around the object being scanned. Servo driven means may also be provided to position the camera along the carriage or arm at predetermined distances away from the object being scanned and in a plurality of predetermined attitudes relative to the surface being scanned so that a pictorial presentation is provided on film of the surface being scanned which is either determined by manual control or in accordance with a programmed cycle. The attitude of the camera may also be controlled by means of a contour sensor riding against or positioned away from the surface whereby the scanning axis of the camera will always be normal or at any predetermined angle to the surface being scanned.

It is also noted that the closed loop film-strip 26 may be replaced by a rotating disc or drum having a sensitized surface or circular band area adapted for receiving light energy in the form of an image line as described and adapted to be rotated in synchronization with the relative movement of the camera or scanner and the object being scanned whereby a circular or cylindrical band image is developable or developed therein and may be scanned or projected as described.

It is noted that the apparatus illustrated in FIGS. 1 and 2 may be modified for mapping not only the surface of the article being scanned but also for investigating and providing a peripheral representation of certain internal or other characteristics of an article or assembly. For example, the photographic camera may be replaced by an infra-red receiver, image generator and recorder adapted to receive infra-red radiation generated internally within the surface or article and record on photographic film in the shape of a film-strip as illustrated, recording disc or drum of sensitized material, by means of a line image as described which line of radiation provides a visual presentation of characteristics of either the surface and/or interior of the object being scanned. Other forms of radiation may comprise (a) a line or band of X-ray or other similar material penetrating radiation modulated in passing through the object being scanned and moved relative to the object and camera in synchronization with the movement of the film; (b) radar signals reflected from the surface being scanned and converted to a visual, photographable image by means of a scope. Movement of the object being scanned in a rotary path as described may suffice to provide a changing image on an oscilloscope which the camera optical system scans and presents a line presentation against the moving film in the manner described.

Since certain changes may be made in the above process and apparatus without departing from the scope of the invention herein involved, it is intended that all matter contained in the above description or shown in the accompanying drawings shall be interpreted as illustrative and not in a limiting sense.

I claim:

1. Camera apparatus for mapping a curved surface and for providing a flat, pictorial representation of said surface comprising in combination with a camera including a housing, an optical system for receiving images to be photographed by said camera, a film strip disposed within said camera, a transport secured within said camera housing for guiding said film strip through the field of said optical system, motor means for controlling the motion of said film strip through said optical system scanning field, said camera being prepositioned relative to the surface to be photographed thereby with the surface and camera in relative motion, means disposed relative to said optical system, means for presenting a narrow band of illuminating light against the surface of the object to be photographed whereby a narrow image strip of the total image of said surface is defined on said film, and means for controlling said motor means to move said film strip at a speed proportional to the relative movement of the surface being scanned through the scanning field of the optical system such that, upon development of said film strip, an image will be provided therein which is substantially a two dimensional map of said surface.

2. Camera apparatus as defined in claim 1 and further including means for rotating the object being scanned at a substantially constant speed.

3. Camera apparatus as defined in claim 2 whereby the object being scanned is rotated during scanning about an axis which passes through the center of volume of the object.

4. Camera apparatus as defined in claim 1 and further including a turntable, said motor means being coupled for rotating said turntable, said object being scanned being positioned on said turntable for rotation therewith, said scanning camera being fixedly disposed adjacent said turntable and positioned with the optical system thereof disposed for scanning the central portion of said object facing said camera.

5. Camera apparatus for mapping a curved surface and for providing a flat recorded pictorial representation of said surface comprising in combination with an object having a substantially convex surface, a camera housing, a camera optical system operatively associated with said housing for receiving images to be photographed by said camera, photographic film disposed within said camera, and operatively positioned whereby a portion of said film will receive light from said optical system, film transport means supported within said camera for guiding said film in a predetermined path within said housing and through the scanning field of said optical system, controlled servo means for driving said film at a predetermined speed, and means associated with said optical system for presenting a line image against said film of a portion of the field being scanned, means for relatively moving said optical system and said object at a speed synchronized to the movement of said film such that the line image scanning said film will generate therein, when said film is developed, an image which is a two dimensional representation of the surface of said object.

6. Camera apparatus as defined in claim 5 wherein said object is substantially convex shaped around its entire surface and has plural surface irregularities protruding outward therefrom.

7. Camera apparatus as defined in claim 5 wherein said means for relatively moving said optical system and said object comprises a mount for said object, and means for moving said mount with the object thereon through the scanning field of said optical system.

8. Camera apparatus as defined in claim 5 wherein said means for relatively moving said optical system and said object comprises a mount for said camera, guide means for guiding said mount in a path around said object, and means for moving said mount with the camera secured thereto around said object with the scanning axis of said optical system always intersecting the surface of said object.

9. Camera apparatus as defined in claim 5 wherein said means moving said optical system and said object includes means for effecting relative movement of said optical system and said object in a plurality of directions whereby said scanning field may be longitudinally shifted while the film and said object move laterally.

10. Camera apparatus as defined in claim 9 and further including means for relatively moving said camera and said object whereby the scanning axis may be angularly varied with respect to the surface of said object.

11. Camera apparatus as defined in claim 5 wherein said light in said optical system is provided by a source of coherent electromagnetic radiation.

12. Camera apparatus as defined in claim 11 wherein said source is an optical maser.

13. Camera apparatus as defined in claim 11 wherein said source is an optical laser.

14. Apparatus for decorating curved surfaces of articles of manufacture comprising in combination with an object to be copied, a photographic system including a periphery camera, said camera having a moving photographic film, means for scanning a surface of said object and providing an image in said film, said scanning means including a mount for said object, means for rotating said mount in front of said camera, whereby the optical system of said camera is presented with a changing image as the object is rotated with said mount masking means disposed in said optical system including means for limiting the image intersecting said film to a narrow band of light, means for developing an image in said film which is a flat representation of the surface of said image, a projection means having a light source and an optical projection system, means for mounting and moving said developed film through the scanning field of said optical projection system, said projection means including means for projecting a changing band of light modulated by said moving film, an article having a surface portion of substantially similar shape to at least a portion of said object to be copied, the surface of said article being photosenitive to light from said projection system, a mount for said article disposed adjacent said projection means, means for securing said article to said mount to receive said band of light, and means for rotating said mount and said article at a rate synchronized to the movement of said moving film to scan and expose said photosensitive surface of said article with a light pattern whereby said surface is developable into image areas of similar light contrast to corresponding image areas of said object photographed.

15. Camera apparatus as defined in claim 14 wherein said light in said optical system is provided from a source of penetrating electromagnetic radiation which is capable of passing through said object to said camera and wherein said object penetrated radiation is presented as a line scans to said film by said masking means.

16. Camera apparatus as defined in claim 15 wherein said source is an X-radiation source.

17. Camera apparatus as defined in claim 15 wherein said source is a gamma radiation source.

References Cited by the Examiner

UNITED STATES PATENTS

| | | | |
|---|---|---|---|
| 1,382,978 | 6/1921 | Hopkins | 88—24 |
| 1,456,954 | 5/1923 | Von Lucken | 96—46 |
| 1,858,786 | 5/1932 | Myers | 96—46 |
| 2,073,313 | 3/1937 | Murray | 96—46 |
| 2,413,349 | 12/1946 | Hancock et al. | 95—12.5 |
| 2,425,929 | 8/1947 | Foster | 88—24 |
| 2,868,070 | 1/1959 | O'Brien et al. | 88—24 |
| 3,066,572 | 12/1962 | Von Bubna-Littitz | 88—24 |
| 3,176,308 | 3/1965 | Jensen | 95—12.5 X |

FOREIGN PATENTS 259,730   10/1926   Great Britain.

NORTON ANSHER, *Primary Examiner.*

N. G. TORDIN, *Examiner.*

A. L. LIBERMAN, R. A. WINTERCORN,
*Assistant Examiners.*